(12) United States Patent
Ollmann

(10) Patent No.: US 9,069,964 B2
(45) Date of Patent: *Jun. 30, 2015

(54) IDENTIFICATION OF MALICIOUS ACTIVITIES THROUGH NON-LOGGED-IN HOST USAGE

(71) Applicant: International Business Machines Corporation, Armonk, NY (US)

(72) Inventor: Gunter D. Ollmann, Norcross, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/153,138

(22) Filed: Jan. 13, 2014

(65) Prior Publication Data

US 2014/0130169 A1 May 8, 2014

Related U.S. Application Data

(63) Continuation of application No. 13/335,270, filed on Dec. 22, 2011, now Pat. No. 8,631,485, which is a continuation of application No. 12/335,824, filed on Dec. 26, 2008, now abandoned.

(51) Int. Cl.
*G06F 21/56* (2013.01)
*G06F 21/55* (2013.01)
*G06F 21/31* (2013.01)

(52) U.S. Cl.
CPC ............ *G06F 21/568* (2013.01); *G06F 21/316* (2013.01); *G06F 21/554* (2013.01); *G06F 21/566* (2013.01)

(58) Field of Classification Search
None
See application file for complete search history.

(56) References Cited

U.S. PATENT DOCUMENTS

| | | |
|---|---|---|
| 6,910,135 B1 | 6/2005 | Grainger |
| 2004/0128543 A1 | 7/2004 | Blake et al. |
| 2005/0154900 A1 | 7/2005 | Muttik |
| 2006/0236392 A1 | 10/2006 | Thomas et al. |
| 2006/0294590 A1* | 12/2006 | Enstone et al. ............ 726/24 |
| 2007/0150938 A1 | 6/2007 | Moon et al. |
| 2008/0028469 A1 | 1/2008 | Repasi et al. |
| 2008/0066179 A1 | 3/2008 | Liu |

(Continued)

OTHER PUBLICATIONS

Page et al., A Buddy Model of Security for Mobile Agent Communities Operating in Pervasive Scenarios, Australian Computer Society, Inc., 2004, pp. 17-25.

(Continued)

*Primary Examiner* — Gilberto Barron, Jr.
*Assistant Examiner* — Malcolm Cribbs
(74) *Attorney, Agent, or Firm* — Schmeiser, Olsen & Watts, LLP; William E. Schiesser

(57) ABSTRACT

A system and associated computer program product for identifying malware. The system includes one or more processors, one or more computer-readable memories, one or more computer-readable storage devices, and program instructions stored on the one or more storage devices for execution by the one or more processors via the one or more memories. The program instructions include program instructions to receive a data communication simulating manual interaction between a user of the computer and the computer. The program instructions may determine that no user was interactively logged on to the computer approximately at a time the data communication was received by the computer, and in response, classify the data communication as a potential malware communication.

11 Claims, 2 Drawing Sheets

(56) References Cited

U.S. PATENT DOCUMENTS

| | | |
|---|---|---|
| 2008/0066180 A1 | 3/2008 | Repasi et al. |
| 2009/0064335 A1* | 3/2009 | Sinn et al. ..................... 726/24 |
| 2009/0106413 A1* | 4/2009 | Salo et al. ..................... 709/224 |
| 2010/0071065 A1 | 3/2010 | Khan et al. |
| 2010/0154061 A1 | 6/2010 | Ollmann |

OTHER PUBLICATIONS

Carvalho et al., Using Mobile Agents as Roaming Security Guards to Test and Improve Security of Hosts and Networks, 2004, ACM Symposium on Applied Computing, pp. 87-93.

Bierman et al., Classification of Malicious Host Threats in Mobile Agent Computing, Proceedings of SAICSIT 2002, pp. 141-148.

Notice of Allowance (Mail Date Sep. 31, 2013) for U.S. Appl. No. 13/335,270, filed Dec. 22, 2011, Conf. No. 3821.

Preliminary Amendment (Dec. 23, 2011) for U.S. Appl. No. 13/335,270, filed Dec. 22, 2011, Conf. No. 3821.

Office Action (Mail Date Oct. 16, 2012) for U.S. Appl. No. 13/335,270, filed Dec. 22, 2011, Conf. No. 3821.

Response (Nov. 9, 2012) for U.S. Appl. No. 13/335,270, filed Dec. 22, 2011, Conf. No. 3821.

Office Action (Mail Date Jan. 23, 2013) for U.S. Appl. No. 13/335,270, filed Dec. 22, 2011, Conf. No. 3821.

Response (Apr. 17, 2013) for U.S. Appl. No. 13/335,270, filed Dec. 22, 2011, Conf. No. 3821.

Final Office Action (Mail Date Jun. 18, 2013) for U.S. Appl. No. 13/335,270, filed Dec. 22, 2011, Conf. No. 3821.

Final Response (Aug. 16, 2013) for U.S. Appl. No. 13/335,270, filed Dec. 22, 2011, Conf. No. 3821.

Amendment after Notice of Allowance (Sep. 18, 2013) for U.S. Appl. No. 13/335,270, filed Dec. 22, 2011, Conf. No. 3821.

Amendment after Notice of Allowance (Sep. 26, 2013) for U.S. Appl. No. 13/335,270, filed Dec. 22, 2011, Conf. No. 3821.

* cited by examiner

IDENTIFICATION OF MALICIOUS ACTIVITIES THROUGH NON-LOGGED-IN HOST USAGE

This application is a continuation application claiming priority to Ser. No. 13/335,270, filed Dec. 22, 2011, now U.S. Pat. No. 8,631,485 issued Jan. 14, 2014, which is a continuation application Ser. No. 12/335,824, filed Dec. 16, 2008, Abandoned Apr. 23, 2012.

FIELD OF THE INVENTION

The present invention generally relates to identifying malicious activities, and more particularly, to a system and method for identifying malicious activities or malware through non-logged-in host usage.

BACKGROUND

Malware, a portmanteau word from the words malicious and software, is software designed to infiltrate or damage a computer system without the owner's informed consent. The expression is a general term used by computer professionals to designate a variety of forms of hostile, intrusive, or annoying software or program code. Many computer users are unfamiliar with the term, and often use "computer virus" for all types of malware, including true viruses.

Software is considered malware based on the perceived intent of the creator rather than any particular features. Malware includes computer viruses, worms, trojan horses, most root kits, spyware, dishonest adware, crimeware and other malicious and unwanted software. Malware is not the same as defective software, that is, software which has a legitimate purpose but contains harmful bugs.

Many early infectious programs, including the first Internet Worm and a number of MS-DOS viruses, were written as experiments or pranks generally intended to be harmless or merely annoying rather than to cause serious damage to computers. However, since the rise of widespread broadband Internet access, malicious software has come to be designed for a profit motive, either more or less legal (forced advertising) or criminal. This can be taken as the malware authors' choice to monetize their control over infected systems: to turn that control into a source of revenue. For instance, since 2003, the majority of widespread viruses and worms have been designed to take control of users' computers for black-market exploitation. Infected "zombie computers" are used to send email spam, to host contraband data, or to engage in distributed denial-of-service attacks as a form of extortion.

Another strictly for-profit category of malware has emerged in spyware, e.g., programs designed to monitor users' web browsing, display unsolicited advertisements, or redirect affiliate marketing revenues to the spyware creator. Spyware programs do not spread like viruses; they are generally installed by exploiting security holes or are packaged with user-installed software, such as peer-to-peer applications. It is not uncommon for spyware and advertising programs to install so many processes that the infected machine becomes unusable, defeating the intention of the attack.

The best-known types of malware, viruses and worms, are known for the manner in which they spread, rather than any other particular behavior. The term computer virus is used for a program which has infected some executable software and which causes that software, when run, to spread the virus to other executable software. Viruses may also contain a payload which performs other actions, often malicious. A worm, on the other hand, is a program which actively transmits itself over a network to infect other computers. A worm may also carry a payload.

The most costly form of malware in terms of time and money spent in recovery has been the broad category known as spyware. Spyware programs are commercially produced for the purpose of gathering information about computer users, showing them pop-up ads, or altering web-browser behavior for the financial benefit of the spyware creator. For instance, some spyware programs redirect search engine results to paid advertisements. Others, often called "stealware" by the media, overwrite affiliate marketing codes so that revenue goes to the spyware creator rather than the intended recipient.

In order to coordinate the activity of many infected computers, malware attackers have used coordinating systems known as botnets. In a botnet scenario, the malware or malbot logs in to, e.g., an internet relay chat (IRC) channel or other chat system. The malware attacker can then give instructions to all the infected systems simultaneously. Botnets can also be used to push upgraded malware to the infected systems, keeping them resistant to anti-virus software or other security measures.

As malware attacks become more frequent, attention has begun to shift from viruses and spyware protection, to malware protection, and programs have been developed to specifically combat such malware attacks. Current anti-malware programs can combat malware in two ways. First, anti-malware programs can provide real time protection against the installation of malware software on a user's computer. This type of spyware protection works the same way as that of anti-virus protection in that the anti-malware software scans all incoming network data for malware software and blocks any threats it comes across. Second, anti-malware software programs can be used solely for detection and removal of malware software that has already been installed onto a user's computer. This type of malware protection is normally much easier to use and more popular. This type of anti-malware software scans the contents of the windows registry, operating system files, and installed programs on a computer and will provide a list of any threats found, allowing a user to choose what they want to delete and what they want to keep, or compare this list to a list of known malware components and removing files which match.

Thus, malware remains an ongoing problem for, e.g., computer users and/or service providers. Accordingly, there exists a need in the art to overcome the deficiencies and limitations described hereinabove.

SUMMARY

In a first aspect of the invention, a method for identifying malware activities, implemented within a computer infrastructure, includes receiving a data communication via a data channel and determining a user is not interactively logged in to a host. Additionally, the method includes identifying the data communication as a potential malware communication in response to the determining the user is not interactively logged in to the host.

In another aspect of the invention, a computer system for identifying malware comprises a storage, a memory and a central processing unit. Additionally, the computer system comprises first program instructions to receive a data communication via a data channel and second program instructions to determine a user is not interactively logged in to a host. Additionally, the computer system comprises third program instructions to identify the data communication as a potential malware communication in response to the determining the user is not interactively logged in to the host. Furthermore, the first, second and third program instructions are stored in the storage for execution by the central processing unit via the memory.

In an additional aspect of the invention, a computer program product comprising a computer usable storage medium having readable program code embodied in the medium is provided. The computer program product includes at least one component operable to receive a data communication via a data channel. Additionally, the at least one component is operable to determine one of a user is not interactively logged in to a host and the user is interactively logged in to the host. Furthermore, the at least one component is operable to identify the data communication as a potential malware communication in response to the determining the user is not interactively logged in to the host and identify the data communication as a non-malware communication in response to the determining the user is interactively logged in to the host. The determining the user is not interactively logged in to the host comprises determining at least one of: the user is not currently logged in to the host; the host is in a screen saver mode; the host is in a keyboard-locked state; and the host is in a screen powered-down mode. The determining the user is interactively logged in to the host comprises determining comprises determining: the user is currently logged in to the host; host is not in the screen saver mode; the host is not in the keyboard-locked state; and the host is not in the screen powered-down mode.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
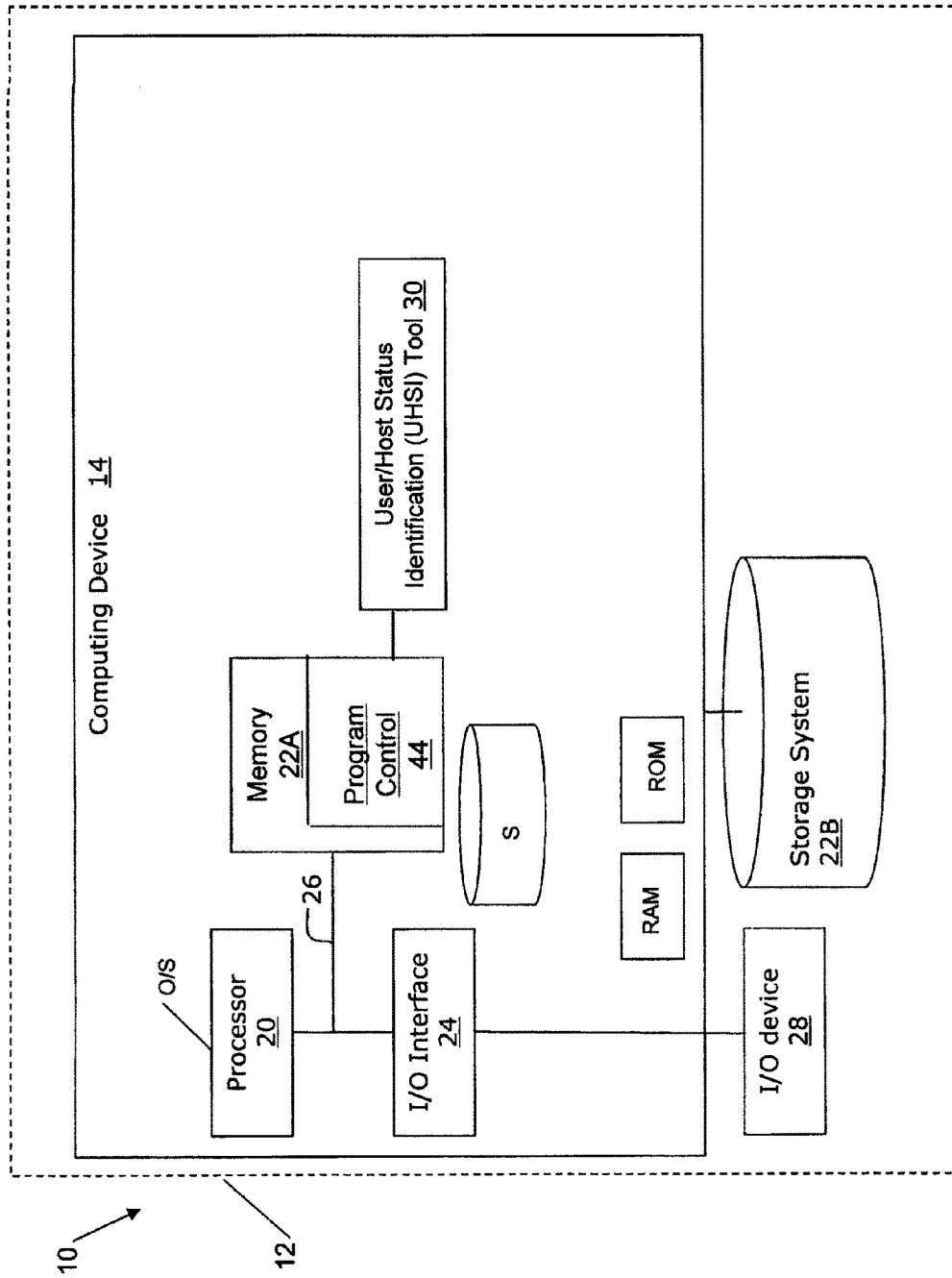
FIG. 1 shows an illustrative environment for implementing the steps in accordance with the invention.

The present invention generally relates to identifying malicious activities, and more particularly, to a system and method for identifying malicious activities or malware through non-logged-in host usage. In accordance with the invention, by determining information about whether a user is interactively logged in to a host and/or whether the host is currently in, for example, a screen-saver mode, "keyboard locked" state, or screen powered down state, it is possible to greatly assist the classification of whether an observed data channel is associated with an unauthorized command and control activity. That is, if a user is interactively logged in to a host, e.g., the user is currently logged in, the host is not in a screen-saver mode, the host is not in a keyboard locked state and the host is not in a screen powered down state, the command and control activity observed on a particular data channel is likely not malware. However, if command and control activity is observed on a particular data channel while the user is not interactively logged in to a host, e.g., the user is not currently logged in, the host is in a screen-saver mode, the host is in a keyboard locked state and/or the host is in a screen powered down mode, the observed command and control activity is likely due to malware.

Current approaches to identifying malware are not operable to determine usage of command and control data channels when a user is not actively logged in to a host and associate this usage with potential malware. For example, many classes of current malware and other unapproved software deployed within a network require specific command and control data channels to be created between the software controller (e.g., the malware creator) and the installed host. However, the user of these command and control data channels can be difficult to identify due to obfuscation and impersonation techniques. That is, whilst the communications may be identified as one type of traffic (e.g. internet relay chat (IRC), ICQ (an internet messaging computer program), and/or hyper-text transfer protocol over secure socket layer (HTTPS)), with current approaches it is non-trivial to ascertain whether the communication is associated with permitted or malicious activities.

By implementing the present invention, a system may detect whether an observed data channel is associated with an unauthorized command and control activity, and thus, detect malware. More specifically, by determining whether a user is, for example, interactively logged in to the host and/or whether the host is current in a screen-saver or "keyboard locked" state, the present invention is operable to determine that an observed data channel is associated with an unauthorized command and control activity. For example, if an observed data channel is associated with command and control activity that is occurring while the user is, for example, not interactively logged in to the host and/or when the host is currently in a screen-saver or "keyboard locked" state, the invention is operable to identify the data channel, and its associated command and control activity, as potentially malware activity. Additionally, implementing the present invention will reduce the time, money and resources expended on recovery due to malware.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:

an electrical connection having one or more wires,
a portable computer diskette,
a hard disk,
a random access memory (RAM),
a read-only memory (ROM),
an erasable programmable read-only memory (EPROM or Flash memory),
an optical fiber,
a portable compact disc read-only memory (CDROM),
an optical storage device, a transmission media such as those supporting the Internet or an intranet, and/or a magnetic storage device.

In the context of this document, a computer-usable or computer-readable storage device may be any tangible device that can store the program for use by or in connection with the instruction execution system, apparatus, or device, but does not include a propagation media. The term "computer-readable storage device" does not encompass a signal propagation media such as a copper cable, optical fiber and wireless transmission media.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider or locally resident on a user's computer (any of which is generally represented in FIG. 1).

The computing device 14 includes a user/host status identification (UHSI) tool 30. The UHSI tool 30 is operable to receive data communications via a data channel, determine whether a user is interactively logged in (e.g., determine whether a user is currently logged in, a host is not in screen-saver mode, the host not in keyboard locked state, and the host not in screen powered-down mode), identify the data communication as a potential malware communication when the user is not interactively logged in, identify the data communication as a non-malware communication when the user is interactively logged in, and store the identification and the associated data channel in a database, e.g., the processes described herein. The UHSI tool 30 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 having program code controls the UHSI tool 30. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a service provider, such as a Solution Integrator, could offer to perform the processes described herein, for example, on a subscription, advertising, and/or fee basis. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

User/Host Status Identification Tool

In accordance with aspects of the invention, the user/host status identification (UHSI) tool 30 is operable to identify a malicious agent or malware in a computer by its external communications. For example, if the UHSI tool 30 determines that a user is actively logged on to a host, e.g., the user is currently logged on to the host, the host is not in a screen saver mode, the host is not in a locked keyboard status and the host is not in a screen powered down mode. The UHSI tool 30 will identify those certain types of communications as valid/not malicious. However, if the UHSI tool 30 determines that the user is not actively logged in to a host, e.g., the user is not currently logged in, the host is in a screen saver mode, the host is in a keyboard locked state, or the host is in a screen powered down mode, then the UHSI tool 30 may determine that all or a subset of the communications are potentially malicious.

For example, malware botnet agents regularly employ internet relay chat (IRC) communications for centralized command and control. Legitimate IRC communications (e.g., non-malware communications) require users to access the keyboard and interact. In accordance with aspects of the invention, if the UHSI tool 30 observes IRC communications, and the UHSI tool 30 determines that, for example, the host does not currently have a user interactively logged in, it is almost certain that the host has been compromised and contains malware using IRC communications for command and control. Thus, according to aspects of the invention, the UHSI tool 30 will identify the communication as a potential malware communication. Additionally, in embodiments, the UHSI tool 30 may prompt a user for action regarding the identified communication, which is likely a malware communication. For example, in embodiments, the UHSI tool 30 may prompt a user for permission to delete the identified malware communication. In additional embodiments, the UHSI tool 30 may automatically remove the identified malware communication without any user input.

Additionally, in embodiments, the UHSI tool 30 may determine command & control traffic being observed (while the screen/keyboard, etc. is inactive) is not an authorized command & control channel. An organization may, for example use it's own remote control tools for updating hosts. Such legitimate command and control channels would already be known to the organization and may be identified, e.g., in a database, (for example, storage system 22B of FIG. 1). As such, when the UHSI tool 30 observes command & control traffic on an unauthorized command & control channel, e.g., as identified in a database, the UHSI tool 30 is operable to identify the command & control traffic as potential malware communications.

In embodiments, the UHSI tool 30 is operable to identify and/or classify command & control channels over a network. For example, the UHSI tool 30 may utilize network sniffing and monitoring devices to detect that certain types of command & control traffic are in operation. This "alert" could then be passed back to a monitoring station that then checks to see if the host sending/receiving the identified command & control traffic is in an interactive state, e.g., a user is actively logged on, e.g., a user is currently logged on to the host, the host is not in a screen saver mode, the host is not in a locked keyboard status and the host is not in a screen powered down mode.

In accordance with further aspects of the invention, the UHSI tool 30 is operable to detect and maintain state information, for example, as to whether a user is currently logged on to the host, whether the screen is currently in screen saver mode, whether the keyboard is currently locked, and/or whether the screen is in a powered down mode, amongst other state information. In embodiments, the state information may be stored in a database, e.g., storage system 22B of FIG. 1. By detecting and maintaining state information as to, e.g., whether a user is currently logged on to the host, whether the screen is currently in screen saver mode, whether the keyboard is currently locked, and/or whether the screen is in a powered down mode, the UHSI tool 30 is able to determine if a user is interactively using the host. In embodiments, the UHSI tool 30 may utilize an operating system's application programming interfaces (APIs) to determine whether a user is currently logged on to the host, whether the screen is currently in screen saver mode, whether the keyboard is currently locked, and/or whether the screen is in a powered down mode, amongst other parameters that may indicate whether a user is interactively logged in to a host. An API is a readable set of functions, procedures, methods or classes that an operating system, library or service provides to support requests made by computer programs.

In additional embodiments, the present invention may utilize a client software agent to determine, e.g., whether a user is currently logged on to the host, whether the screen is currently in screen saver mode, whether the keyboard is currently locked, and/or whether the screen is in a powered down mode. That is, as should be understood by those ordinarily skilled in the art, a client software agent may be created to perform the detection role performed by an operating system's APIs.

In accordance with further aspects of the invention, the UHSI tool 30 is operable to combine the state information with the identification of external communication protocols (unexpected or otherwise) that are typically associated with interactive use to classify (e.g., either directly, or as part of a likelihood calculation) whether the communication channel is associated with a malware or an unapproved command and control data channel. Moreover, in embodiments, the UHSI tool 30 is operable to store the association of the data communication channel with the identified malware communication, or the data communication channel with the identified non-malware communication, in a database, e.g., storage system 22B of FIG. 1.

Flow Diagram

Figure 2:
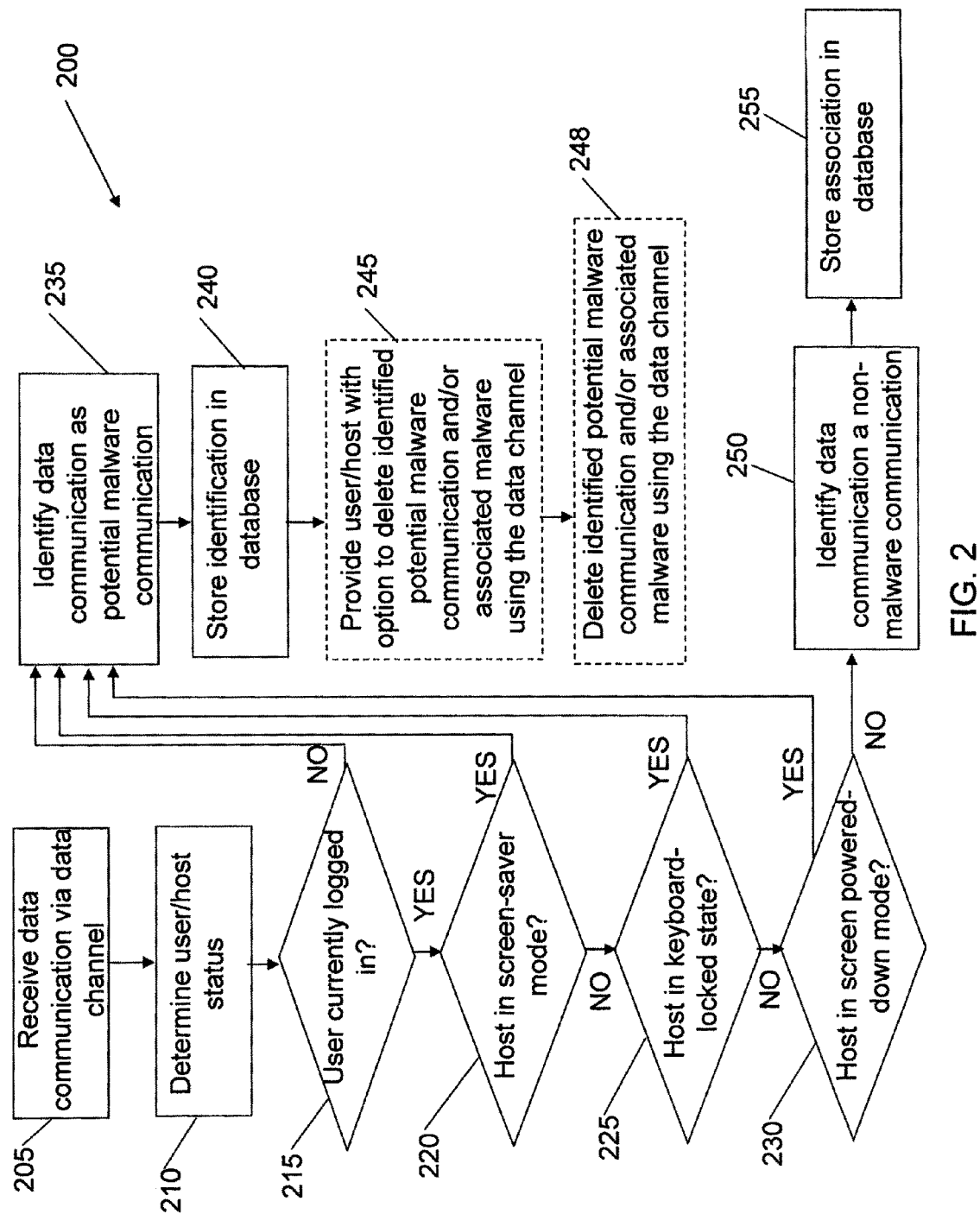
FIG. 2 shows an exemplary flow for identifying malicious activities through non-logged-in host usage in accordance with aspects of the present invention.

FIG. 2 shows an exemplary flow 200 for performing aspects of the present invention. The steps of FIG. 2 may be implemented in the environment of FIG. 1, for example. The flow diagram may equally represent a high-level block diagram of the invention. The flowchart and/or block diagram in FIG. 2 illustrates the architecture, functionality, and operation of possible implementations of systems, methods and computer program products according to various embodiments of the present invention. In this regard, each block in the flowchart or block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagram may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer readable storage device or computer readable storage medium can be an apparatus that can store the program for use by or in connection with the instruction execution system, apparatus, or device. The storage device or medium can be an electronic, magnetic, optical, electromagnetic, or semiconductor system (or apparatus or device). Examples of a computer-readable storage device or medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD. The term "computer-readable storage device" does not include signal propagation media such as copper cables, optical fibers and wireless transmission media.

As shown in FIG. 2, at step 205, the UHSI tool receives a data communication via a data channel. At step 210, the UHSI tool determines the user/host status. As discussed above, in embodiments, the UHSI tool may determine the user/host status using one or more APIs and/or one or more client software agents. At step 215, the UHSI tool determines whether a user is currently logged in to a host based on the determined user/host status. If, at step 215, the UHSI tool determines that the user is currently logged in to the host, then the process proceeds to step 220. If, at step 215, the UHSI tool determines that the user is not currently logged in to the host, the process proceeds to step 235, discussed further below.

At step 220, the UHSI tool determines whether the host is in a screen-saver mode based on the determined user/host status. If, at step 220, the UHSI tool determines that the host is not in the screen-saver mode, then the process proceeds to step 225. If, at step 220, the UHSI tool determines that the host is in the screen-saver mode, then the process proceeds to step 235, discussed further below.

At step 225, the UHSI tool determines whether the host is in a keyboard locked state based on the determined user/host status. If, at step 225, the UHSI tool determines that the host is not in the keyboard locked state, then the process proceeds to step 230. If, at step 225, the UHSI tool determines that the host is in the keyboard locked state, then the process proceeds to step 235, discussed further below.

At step 230, the UHSI tool determines whether the host is in a screen powered-down mode based on the determined user/host status. If, at step 230, the UHSI tool determines that the host is not in the screen powered-down mode, then the process proceeds to step 250. If, at step 230, the UHSI tool determines that the host is in the screen powered-down mode, then the process proceeds to step 235, discussed further below. Those of skill in the art will recognize that other parameters to indicate whether a user is interactively logged in to a host are also contemplated by the present invention.

At step 250, the UHSI tool identifies the data communication as a non-malware communication. At step 255, the UHSI tool stores the identified data communication and an association to the data channel in a database.

At step 235, the UHSI tool identifies the data communication as a potential malware communication. At step 240, the UHSI tool stores the identification and an association to the data channel in a database. At optional step 245, the UHSI tool provides a user and/or host with an option to delete the identified potential malware communication, and/or the detected potential malware. At optional step 248, the UHSI tool deletes the potential malware communication and or the detected potential malware. As should be understood, the dashed lines of steps 245 and 248 indicate that, in embodiments, steps 245 and 248 are optional steps.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A computer system for identifying malware, the computer system comprising:
one or more processors, one or more computer-readable memories, one or more computer-readable storage devices, and program instructions stored on the one or more storage devices for execution by the one or more processors via the one or more memories, the program instructions comprising:
program instructions to receive a data communication simulating manual interaction between a user of a computer and the computer, wherein the data communication simulates manual user input, via a keyboard, to a chat session;
program instructions to determine that no user was interactively logged on to the computer approximately at a time the data communication was received by the computer, and in response, classify the data communication as a potential malware communication; and
program instructions, responsive to the classification of the data communication as a potential malware communication, to determine a program within the computer which initiated the data communication and delete the program which initiated the data communication.

2. A computer system for identifying malware, the computer system comprising:
one or more processors, one or more computer-readable memories, one or more computer-readable storage devices, and program instructions stored on the one or more storage devices for execution by the one or more processors via the one or more memories, the program instructions comprising:

program instructions to receive a data communication simulating manual interaction between a user of a computer and the computer;

program instructions to determine that no user was interactively logged on to the computer approximately at a time the data communication was received by the computer, and in response, classify the data communication as a potential malware communication; and program instructions, responsive to the classification of the data communication as a potential malware communication, to determine a program within the computer which initiated the data communication and delete the program which initiated the data communication, wherein the program instructions to determine that no user was interactively logged on to the computer approximately at the time the data communication was received by the computer determines that no user was interactively logged on to the computer approximately at the time the data communication was received by the computer by determining that a user was logged on to the computer approximately at the time the data communication was received by the computer and the computer was at approximately the time the data communication was received by the computer, in a screen saver mode, in a keyboard-locked state, or in a screen powered-down mode.

3. A computer program product for identifying malware, the computer program product comprising:

one or more computer-readable storage devices and program instructions stored on the one or more storage devices, the program instructions comprising:

program instructions to receive a data communication simulating manual interaction between a user of a computer and the computer, wherein the data communication simulates manual user input, via a keyboard, to a chat session; and program instructions to determine that no user was interactively logged on to the computer approximately at a time the data communication was received by the computer, and in response, classify the data communication as a potential malware communication.

4. The computer program product of claim 3, further comprising:

program instructions, responsive to the classification of the data communication as a potential malware communication, to determine a program within the computer which initiated the data communication and delete the program which initiated the data communication.

5. The computer program product of claim 3, wherein the program instructions to determine that no user was interactively logged on to the computer approximately at the time the data communication was received by the computer determines that no user was interactively logged on to the computer approximately at the time the data communication was received by the computer by determining that a user was logged on to the computer approximately at the time the data communication was received by the computer and the computer was at approximately the time the data communication was received by the computer, in a screen saver mode, in a keyboard-locked state, or in a screen powered-down mode.

6. A computer program product for identifying malware, the computer program product comprising:

one or more computer-readable storage devices and program instructions stored on the one or more storage devices, the program instructions comprising:

program instructions to receive a data communication simulating manual interaction between a user of a computer and the computer; and program instructions to determine that no user was interactively logged on to the computer approximately at a time the data communication was received by the computer, and in response, classify the data communication as a potential malware communication, wherein the program instructions to determine that no user was interactively logged on to the computer approximately at the time the data communication was received by the computer, determines that no user was interactively logged on to the computer approximately at the time the data communication was received by the computer, by determining that a user was logged on to the computer approximately at the time the data communication was received by the computer and the computer was at approximately the time the data communication was received by the computer, in a mode or state selected from the group consisting of a screen saver mode, a keyboard-locked state, or a screen powered-down mode.

7. The computer program product of claim 6, wherein the mode or state is the screen saver mode.

8. The computer program product of claim 6, wherein the mode or state is the keyboard-locked state.

9. The computer program product of claim 6, wherein the mode or state is the screen powered-down mode.

10. The computer program product of claim 6, wherein the data communication simulates manual user input via a keyboard.

11. The computer program product of claim 6, further comprising:

program instructions, responsive to the classification of the data communication as a potential malware communication, to determine a program within the computer which initiated the data communication and delete the program which initiated the data communication.

* * * * *